No. 694,209. Patented Feb. 25, 1902.
J. M. SMITH.
VEHICLE.
(Application filed Nov. 18, 1901.)
(No Model.) 2 Sheets—Sheet 1.

Witnesses:
D. W. Edelin
E. C. Duffy

Inventor:
John M. Smith
By J. E. Stebbins
Atty.

No. 694,209. Patented Feb. 25, 1902.
J. M. SMITH.
VEHICLE.
(Application filed Nov. 18, 1901.)
(No Model.) 2 Sheets—Sheet 2.

Witnesses:
D. W. Edelin.
E. C. Duffy.

Inventor:
John M. Smith.
By F. F. Stebbins, Atty.

UNITED STATES PATENT OFFICE.

JOHN M. SMITH, OF ATLANTA, GEORGIA.

VEHICLE.

SPECIFICATION forming part of Letters Patent No. 694,209, dated February 25, 1902.

Application filed November 18, 1901. Serial No. 82,676. (No model.)

*To all whom it may concern:*

Be it known that I, JOHN M. SMITH, a citizen of the United States, residing at Atlanta, in the county of Fulton and State of Georgia, have invented new and useful Improvements in Vehicles, of which the following is a specification.

My invention relates to improvements in vehicles, and in particular to that type known as "rockaway" or "depot" wagons, and has for its object the provision of such a construction that shall permit the converting of a portion of the outside or driver's seat into an inner seat, thus enlarging the inclosed or sheltered seating capacity of the vehicle.

With this end and purpose in view my invention consists in a vehicle having two partitions, one of which is adapted to be moved from a position in line with the rear seat-rail of the front seat to a position in line with the front rail of the said seat.

It further consists in certain novelties of arrangement, construction, and combinations of parts, as herein set forth and claimed.

The accompanying drawings, which form a part of this specification, illustrate an example of the physical embodiment of my invention constructed according to the best mode I have so far devised for the practical application of the principle.

Figure 1:
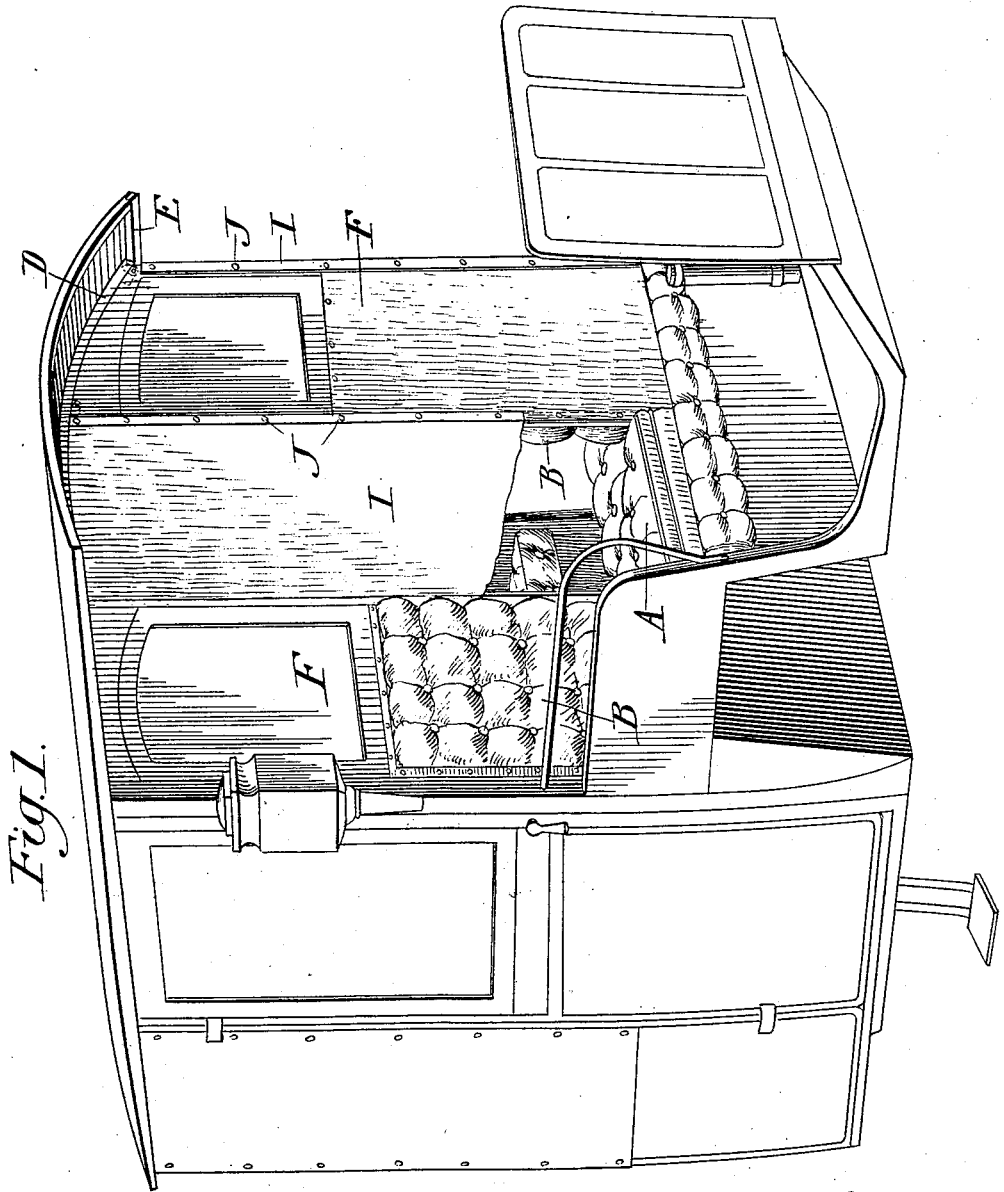
Figure 2:
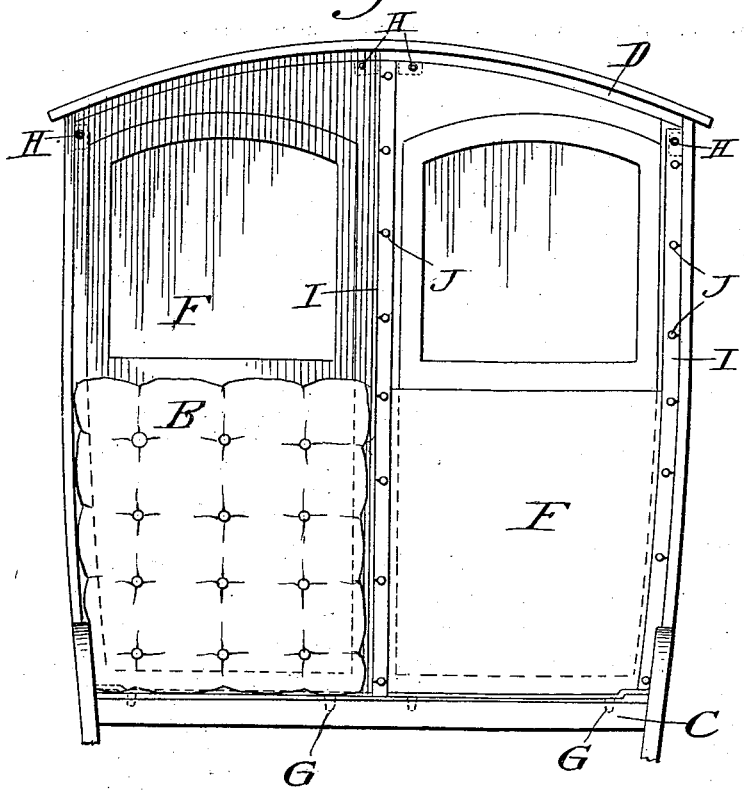
Figure 3:
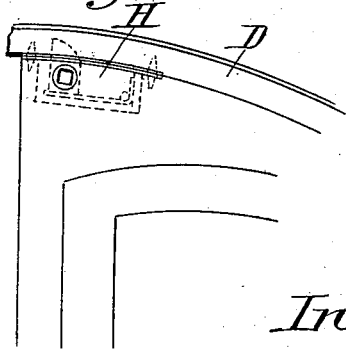

Figure 1 is a perspective view of a rockaway-body embodying my invention, the parts being in such positions as to inclose the lefthand portion of the coachman's seat and one of the curtains being broken away to show the inside of the vehicle and the arrangement of the cushion and back-upholstering on the frame or partition. Fig. 2 is a view of Fig. 1 as it appears when viewed from the front of the vehicle, the movable partition and the back-upholstering of the coachman's seat being shown in elevation. Fig. 3 is a fragmentary view, on an enlarged scale, showing in dotted lines one of the locks which secure the partitions in position.

Referring to the drawings, the vehicle-body is provided with a driver's or coachman's seat having the divided cushions A and divided back-upholstering B.

The letter C designates the seat-rail at the front of the seat, which extends across the carriage-body and to which the removable back frame or partition F is detachably secured at the bottom by the dowel-pins G, as shown.
A similar rail is located at the back of the seat, to which the other seat frame or partition is secured either permanently or detachably. The frames or partitions F F are also secured to the arch rails or ribs D and the top-rails E by the catches or locks H, located at the corners of the partitions. As any ordinary or well-known lock or catch may be used, the same is not specifically described herein. The arch rails or ribs D D extend transversely of the carriage-top beneath the roof-covering and substantially in vertical planes with the seat-rails C C, their ends being secured to the top-rails E, which extend longitudinally at the outer edges of the said roof. Side curtains I I are secured to the frames or partitions F F by catches or knobs J, the latter being of any usual or well-known construction.

When the vehicle is in ordinary use and no more than inside seating capacity for two persons is required, the single back inclosed seat of the vehicle is sufficient, and the entire driver's seat can be utilized as an outside or open seat, in which case the middle curtain I is detached, the back-upholstering and seat-cushion B of the inclosed or left-hand portion removed, the back frame or partition F detached from the front seat-rail and archrail D and moved backwardly until in a plane with the right-hand back frame or partition F, where it is secured to the rear seat-rail C by the dowel-pins G and to an arch-rail D and a top-rail E by the catches H. The removed seat-cushion and upholstering are placed in front of the adjusted back frame or partition, so as to accommodate two persons on the front or coachman's seat. It is obvious that to change the seat again to the position shown in Fig. 1 the left-hand seat-cushion and its back-upholstering are removed, the left-hand back frame or partition released from its connected arch-rail, top-rail, and seat-rail, then moved forward, and secured to another archrail, top-rail, and seat-rail. The removed cushion and back-upholstering are placed as in Fig. 1 and the side curtains I I fastened in place upon the knobs or catches J, so that an inside seat is added to the seating capacity of the inclosed portion of the vehicle.

The conversion or change of the section of the coachman's seat from one described condition or position to the other is a matter requiring but little time or labor, the only part not in use in both conditions being the middle curtain I, which can be folded and kept in some convenient place for use when required. While the left-hand section of the seat has been described as convertible or changeable, it is to be understood that either section can be changed from outer to inner or from inner to outer seats, as desired.

Modifications and changes in details can of course be introduced in the carrying out of my invention without constituting a substantial departure.

What I claim as new, and desire to secure by Letters Patent, is—

1. A vehicle having two partitions or frames, F F, and one of said partitions adapted to be moved from its normal position on a line with the rear seat-rail to a position in line with the front seat-rail; and means for holding the said removable partition in a vertical position.

2. A carriage-body having a front seat with divided parts so constructed and arranged that a part thereof may be either inclosed with a closed portion of the body of the carriage or be open in front; in substance as set forth.

3. A carriage-body with front and rear seat-rails, a back frame or partition adapted to be detachably secured to either of said seat-rails, and removable side curtains adapted to be attached to said back-frame and other parts of the carriage where said back-frame is secured to the front seat-rail, thereby forming an inclosed space in communication with the rear inclosed space of the vehicle; in substance as set forth.

4. A carriage-body with seat-rails extending transversely across the same, a roof with transversely-extending arch-rails, a separate back-frame adapted to be alternately detachably secured to an arch and seat rails at the rear and front of the seat, and a movable cushion and back-upholstering; said parts being combined substantially as described.

5. In a carriage-body, two transversely-extending seat-rails and a detachable back-frame adapted to be secured in a vertical position to either of said seat-rails; substantially as described.

6. The combination with a vehicle having a seat-frame, of a vertical partition, said partition being adapted to occupy positions at the rear or front of said seat-frame; and means for detachably securing the said partition in place.

In testimony whereof I affix my signature in presence of two witnesses.

JOHN M. SMITH.

Witnesses:
RALPH SMITH,
C. A. CONSTANTINE.